July 4, 1933.  K. D. STORCH  1,917,074
SUPPORT FOR AUTOMOBILE HOODS
Filed Dec. 9, 1931
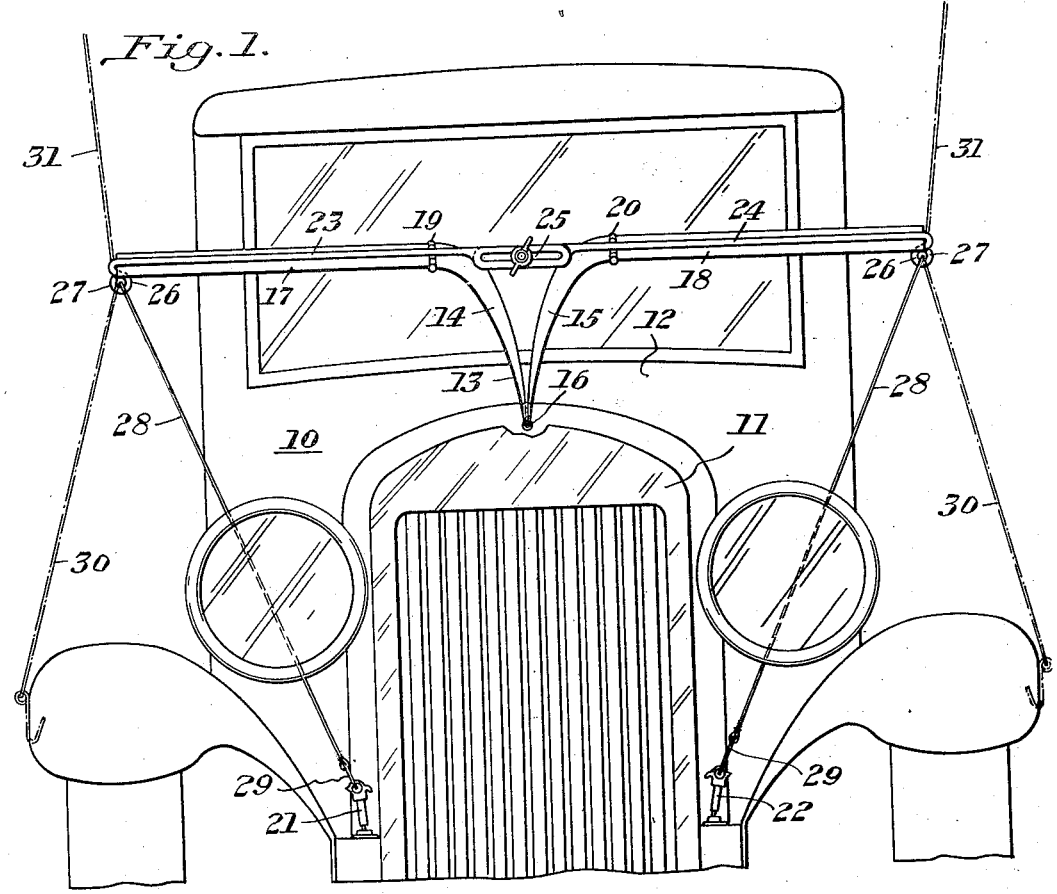
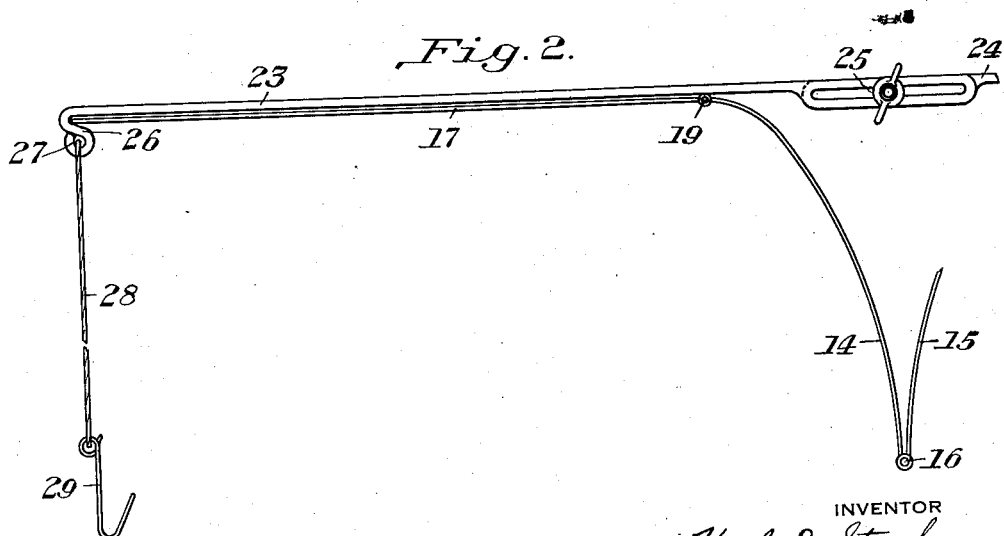
INVENTOR
Karl D. Storch
by his attorneys
Byrnes, Stebbins, Parmelee & Blenko Patented July 4, 1933

1,917,074

UNITED STATES PATENT OFFICE

KARL D. STORCH, OF PITTSBURGH, PENNSYLVANIA

SUPPORT FOR AUTOMOBILE HOODS

Application filed December 9, 1931. Serial No. 579,977.

My invention concerns a device for supporting the normally depending portions of an automobile engine hood in elevated position so as to render more accessible all parts of the engine.

While supporting mechanisms for automobile hoods have been proposed heretofore, none of them with which I am familiar provide a satisfactory means for holding the lower edges of an automobile engine hood up out of the way of a mechanic working on the engine or for display purposes. In fact, I am aware of only one device which at all pretends to provide such means, and it is only partially effective and does not support the hood out of the way of the mechanic. It is an object of this invention, therefore, to provide hood supporting means which will maintain the hood in uplifted position out of the way of the mechanic, so that he can obtain easy access to all parts of the space beneath the hood. The desirability of such means will be apparent immediately when it is recalled that in the absence thereof, it is necessary for the hood to be removed entirely from the body of the motor car or for opposite sides of the hood to be alternately raised or lowered. Both of these methods of procedure are exceedingly awkward and the latter also tends to cut off the light from the closed side of the hood.

I have invented means for holding the hood up out of the workman's way and, at the same time, maintaining it rigidly in position against the possibility of accidental tilting or falling. In accordance with my invention, I provide an adjustable bar having hooks formed on each end thereof, adapted to engage the lower edge of the side portions of the hood. This bar is adjustable and forms a tension member for holding side members of the hood in horizontal position. When supported thus, the hood is braced or guyed against tilting or falling by auxiliary adjustable tension members such as wires or rods extending to any suitable fixed support.

For a clear understanding of the invention, reference is made to the accompanying drawing illustrating a present preferred embodiment thereof.

In the drawing,

Figure 1 is a front view, largely diagrammatic, of a motor car having the side members of the hood maintained in horizontal position by the support of my invention; and Figure 2 is a partial front elevation to enlarged scale, showing the manner of applying the device to the hood of the motor car.

Referring now in detail to the drawing, a motor car body is indicated diagrammatically at 10. The engine space between the radiator 11 and the cowl 12 is covered by a hood 13 of usual construction, including top members 14 and 15 hinged together at 16, and side members 17 and 18 hinged to the top members 14 and 15 at 19 and 20. Normally, of course, the members comprising the hood engage suitable seating surfaces on the radiator and cowl, the lower edges of the members 17 and 18 seating on a so-called hood sill. Hood holders 21 and 22 are pivoted to the hood sill for securing the hood firmly in position.

When it is desired to gain access to the engine space beneath the hood 13, the holders 21 and 22 are released and the hood is raised. If any considerable amount of work is to be done on the engine, it is desirable, of course, to have both sides of the hood raised and the support of my invention provides means for maintaining both sides of the hood in open position, thus permitting free access to all parts of the engine and exposing the parts to the light.

The hood support of my invention comprises hook members 23 and 24 having an adjustable screw and slot connection 25. The outer ends of the members 23 and 24 are provided with hook portions 26 and the latter are bent back on themselves to form eyes 27 for a purpose which will appear later. Since outward movement of the portions 17 and 18 of the hood on the hinges 19 and 20 is limited in the usual construction of hood, when the side portions 17 and 18 are raised and opened outwardly, the top portions 14 and 15 of the hood will likewise be opened and raised. With the two halves of the hood in the illustrated position, the hook members 23 and 24 are slipped over the lower edges of the side portions 17 and 18 and the adjustable connection 25 is secured to maintain the portions of the hood in the desired position of elevation.

While the hood is fairly accurately balanced in the position shown in Figure 1, it is desirable to have means providing additional bracing therefor. Such means may take the form of guy wires or rods 28 secured in the eyes 27 of the hook members 23 and 24. The wires 28 may be provided with hooks 29 or clamps for engaging the finger holes in the holders 21 and 22 on the hood sills. Instead of connecting the wires 28 to the holders 21 and 22, however, the hooks 29 may be secured under the edges of the fenders as shown in dotted lines at 30, or on spare tires when the latter are mounted on the side of the body. If desired, guy wires 31 may extend upwardly to the ceiling, having hooks at their lower ends for engaging the eyes 27.

While I have illustrated but one pair of hook members 23 and 24 applied to the hood, it would be obvious that two such sets of hook members may be employed, one toward the front of the hood and one toward the rear thereof if the hood is unusually long and heavy. For lighter hoods of comparatively small length, one set of hook members should prove sufficient. Similarly, the guy wires may be duplicated at the front and rear of the hood or I may use one at the front and one at the rear as convenience and local conditions may dictate.

It will be apparent that the support of my invention provides means for maintaining both halves of a motor car hood in uplifted position, so that a workman can effect the necessary repairs or adjustments with the greatest facility and without the necessity of removing the hood or alternately raising or lowering opposite halves thereof. At the same time, the hood when supported in the open position is firmly braced and guyed against tilting, wabbling, or accidental falling. It will be apparent that the invention is a great convenience to workmen in garages, as well as to automobile owners who make their own adjustments and repairs. It may also be used in display rooms to exhibit the engine and other parts.

Although I have illustrated and described herein but a single preferred embodiment of the invention, it will be recognized that many changes in the details of construction described can be made without departing from the spirit of the invention or sacrificing the advantages thereof, within the scope of the appended claims.

I claim:

1. A device for maintaining the portions of a motor car hood in an uplifted position, comprising a pair of hook members for engaging the lower edges of the sides of the hood and overlying the outstretched width thereof, an adjustable connection between said hook members, and means for bracing the hood in its uplifted position.

2. A device for supporting the side and top portions of a motor car hood in uplifted, outstretched position comprising a pair of hook members for removably overlying the outstretched hood and engaging the lower edges of the side portions of the hood, a connection between said members, and means for bracing the hood in its uplifted position.

3. A device for holding the portions of a motor car hood in uplifted, outstretched, V-forming position, comprising a member adapted to extend across the open top of the V, means on said member engaging the sides of the hood adjacent their edges, and bracing means for steadying the uplifted hood.

4. Supporting mechanism for holding a motor car hood in elevated position, comprising a pair of hook members for engaging the outstretched side portions of the hood adjacent their free edges, tension means extending transversely above the elevated hood for securing the hook members together, and bracing means for steadying the uplifted hood.

In testimony whereof I have hereunto set my hand.

KARL D. STORCH.